Oct. 27, 1959   J. M. CRAWFORD ET AL   2,910,134
METHOD OF COUPLING A VIBRATOR TO AN ELASTIC MEDIUM
Filed June 17, 1955

INVENTOR.
JOHN M. CRAWFORD
FRANK CLYNCH
BY
*Jerry J. Dunlap*
ATTORNEY

United States Patent Office 2,910,134
Patented Oct. 27, 1959

2,910,134
METHOD OF COUPLING A VIBRATOR TO AN ELASTIC MEDIUM

John M. Crawford and Frank Clynch, Ponca City, Okla., assignors to Continental Oil Company, Ponca City, Okla., a corporation of Delaware Application June 17, 1955, Serial No. 516,288

6 Claims. (Cl. 181—.5)

This invention relates generally to improvements in the art of seismic surveying, and more particularly, to an improved method of and an apparatus for coupling a vibrator to an elastic medium.

In the most common method of seismic surveying, the seismic waves are generated by an explosive. Ordinarily the explosive consists of a charge of dynamite and, in use, the dynamite is buried in a shot hole to prevent a blast of energy into the surrounding atmosphere and to muffle the noise of the explosion. In this method, however, the energy generated is extremely large and the coupling of the energy source to the earth is not of particular importance.

In recent years, several different methods of seismic surveying have been devised which utilize a vibrating energy source, such as a mechanical vibrator. An example of such a method is disclosed in U.S. Patent No. 2,688,124 entitled "Method of and Apparatus for Determining Travel Time of Signals" issued on August 31, 1954, to William E. N. Doty and John M. Crawford. The vibrators used in such methods inherently provide limited energy, as compared to an explosive charge, and it becomes important to provide an efficient transmission of the vibrator energy into the earth.

A mechanical vibrator generates upward and downward forces of sufficient magnitude to oscillate the entire vibrator and its supporting structure. Therefore, when the vibrator is coupled to the earth (an elastic medium), at least a portion of the energy produced by the oscillating vibrator is transmitted into the earth. In analyzing the energy produced by the vibrator and the portion of such energy transferred into the earth, three basic principles should be considered.

Firstly, when a vibrator oscillates, the inertia of the vibrator is proportional to its acceleration and mass. Secondly, when the surface of the earth is vibrated, the acceleration of the surface is proportional to the amplitude and the square of the frequency of vibration. And thirdly, the energy imparted to the earth is proportional to the amplitude of the vibrations.

In most soils, the elastic limit is such that the acceleration corresponding to the frequencies considered the most useful in seismic exploration is many times the acceleration due to gravity. However, the acceleration of the vibrator (and hence the acceleration actually imparted to the surface of the earth) is limited by its inertia and mass for a given power output of the vibrator. Therefore, the mass of the vibrator is a limiting factor in the actual acceleration, amplitude, and energy imparted to the earth for a given power output of the vibrator; whereas, the elastic limit of the earth should be the limiting factor in the amount of energy imparted.

The most common and obvious method of coupling a vibrator to the earth is by merely setting the vibrator directly on the surface of the earth without the use of weights. In this method, when the vibrator produces sufficient energy to provide a vibration of the surface of the earth, the upward forces generated by the vibrator often provide an upward acceleration of the vibrator greater than the acceleration provided by gravity and cause the vibrator to jump up off of the surface. As a result, the vibrator is incapable of providing a continuous transmission of energy into the earth.

Another common method of coupling a vibrator to the earth is by placing sufficient weight on the vibrator to prevent it from jumping. However, when the basic principles set forth above are considered, it will be readily seen that the inertia of the vibrator and the added mass limits the amplitude which can be imparted to the earth for a given power output of the vibrator. In other words, the power output of the vibrator must be sufficient to overcome the inertia of the added mass, since the mass moves with the vibrator. In order to increase the amplitude of the vibrator and provide a transmission of sufficient energy to the earth, the power output of the vibrator must be substantially increased.

Still another known method is to anchor the vibrator through the use of bolts cemented in the ground. This method is acceptable when only a limited number of vibrator locations are required, since the ground must be damaged and the cost is relatively high. However, in seismic prospecting, a large number of vibrator locations may be very desirable, and it may also frequently be desirable to move the vibrator during operation.

The present invention contemplates a method of and apparatus for coupling a vibrator to the surface of the earth, whereby the vibrator will be retained in contact with the earth during operation to provide an efficient transfer of energy from the vibrator into the earth. A sufficient weight or force is imposed on the vibrator to prevent the vibrator from jumping, yet the vibrator does not have to overcome any appreciable inertia forces except those arising from movement of the vibrator per se. Therefore, the power generated by the vibrator may be used almost entirely for inducing vibrations in the earth.

An important object of this invention is to provide an efficient transmission of energy from a vibrating source to an elastic medium.

Another object of this invention is to generally facilitate methods of seismic surveying utilizing vibrating sources of energy.

Another object of this invention is to provide an economical method of and apparatus for coupling a vibrator to the earth, wherein the major portion of the power generated by the vibrator is utilized in transmitting energy into the earth.

A further object of this invention is to provide a method of coupling a vibrator to the earth requiring only simple apparatus for performing the method.

Another object of this invention is to provide a method of coupling a vibrator to the earth wherein the vibrator may be dragged along the surface of the earth during the transmission of energy into the earth.

A still further object of this invention is to provide a method of coupling a vibrator to the earth wherein the vibrator may be moved and recoupled to the earth in a minimum of time with a minimum of manpower.

Other objects and advantages of the invention will be evident from the following detailed description, when taken in conjunction with the accompanying drawings, which illustrate our invention.

In the drawings:

Figure 3 is a sectional view taken along lines 3—3 of

Figure 2 with the vibrator again illustrated schematically.

Figure 4:
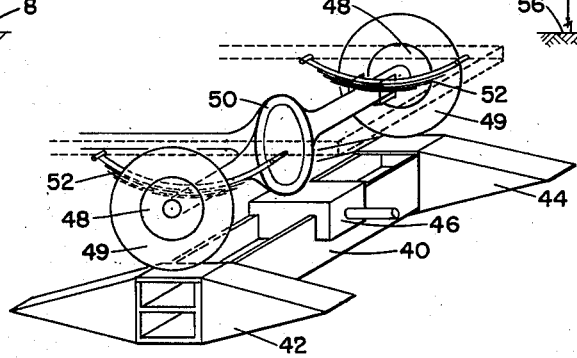

Figure 4 is a perspective view of another form of apparatus which may be used in coupling a vibrator to the earth.

Figure 5:
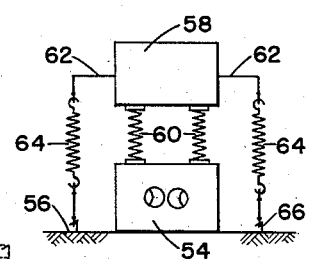

Figure 5 is another schematic illustration of still another form of apparatus which may be used.

Broadly stated, the present invention may be defined as a method of coupling a vibrator to the surface of the earth which comprises elastically coupling thereto a downwardly acting force having a magnitude greater than any vertically upward components of the forces acting on the vibrator supporting structure minus the weight of the vibrator.

Figure 1:
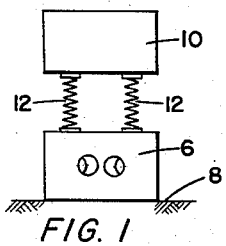
Figure 1 is an elevational schematic illustration of one form of apparatus which may be used in practicing the method of this invention.

Referring to the drawings in detail, and particularly Figure 1, reference character 6 designates a mechanical vibrator which is resting directly on the surface of the earth 8. A large body or mass 10, of a confined size for convenient handling, is supported on the top of the vibrator 6 by a plurality of compression springs 12. The springs 12 may be secured to the vibrator 6 and mass 10 in any desired manner and any number of springs may be used, providing they have the proper characteristics, as will be hereinafter set forth.

In operation of the apparatus shown in Figure 1, the vibrator 6 generates upward and downward forces to oscillate the vibrator and provide vibration of the earth 8 directly under the vibrator. The earth 8, being an elastic medium, will move upwardly and downwardly in compliance with the forces imposed, and in synchronism with the oscillations of the vibrator 6. In accordance with the present invention, the mass 10 must exert a downward force through the springs 12 of sufficient magnitude to overcome all upward forces generated by and acting on the vibrator 6, minus the weight of the vibrator, in order that the vibrator 6 will be maintained in continuous contact with the surface of the earth 8. However, the springs 12 should have compliance characteristics such that the mass 10 will be held substantially motionless during oscillation of the vibrator 6. Therefore, only a minor amount of energy is required to overcome the inertia forces of the mass 10, and substantially all of the power generated by the vibrator 6 will be used in creating seismic energy waves in the earth 8.

The theoretical study of the system shows that, if M is the static mass 10 used to keep the vibrator 6 on the ground and $$C_m = \frac{1}{K}$$

is the mechanical compliance of the springs 12 or other material coupling between the static mass and the vibrator, the differential equation of motion of the mass is $$M\frac{d^2z}{dt^2} + Kz = Fe^{-ipt}$$

where F is the amplitude of the force generated by the vibrator, p is its angular velocity, z is the vertical displacement of the mass M, and K is a constant. If $$n^2 = \frac{K}{M} = \frac{4\pi^2}{T^2}$$

is the square of the resonant angular velocity of the system having a period T when no outside force is impressed, the solution is:

$$z = C_m e^{-int} + \frac{a}{n^2 - p^2} e^{-ipt}$$

where $$a = \frac{F}{M}$$

is the ratio between the amplitude of the sinusoidal force generated by the vibrator and the static mass or, in other words, the acceleration given by the maximum forces to the static mass.

This solution can also be written, if $$f = \frac{p}{2\pi}$$

and $$f_0 = \frac{n}{2\pi}$$

$$z = C_m e^{-2\pi i f_0 t} + \frac{a}{4\pi^2(f_0^2 - f^2)} e^{-2\pi i f t}$$

which shows clearly that if $f = f_0$ the amplitude of the oscillations becomes very large.

In this study, the vibrating force has been idealized, that is, the weight of the generating structure itself has been neglected. Neither has the mechanical impedance of the earth been considered, since it varies with different types of soils. A more detailed study would have involved a damping effect due to the mechanical resistance $R_m$ and the equation of motion would have been:

$$M\frac{d^2z}{dt^2} + R_m\frac{dz}{dt} + Kz = Fe^{-ipt}$$

and the solution becomes $$\left(\text{putting } h = \frac{R_m}{2M}\right):$$

$$z = C_m e^{-ht - 2\pi i f_0 t} + \frac{a}{4\pi^2(f_0^2 - f^2) - 4\pi i f h} e^{-2\pi i f t}$$

where the first term corresponds to the transient and the second to the steady state motion. This shows clearly that in the steady state motion, the amplitude of vibration of the mass 10 will be small when the frequency of the vibrator 6 is very different from the resonant frequency of the system. Thus, almost all the energy generated by the vibrator 6 is radiated into the medium, while a negligible portion of it is lost in overcoming the inertia of the static mass 10.

The amplitude and phase of the forced motion of the static mass 10 are functions of the frequency of the driving force. When the frequency is very different from the resonant frequency of the system, the amplitude of forced motion of the mass 10 is very small. But when the system is energized at its resonant frequency, the amplitude of forced motion becomes very large. The phase between the forced motion of the mass 10 and the driving force of the vibrator 6 varies from zero at frequencies much lower than the resonant frequency of the system (forced motion in exact synchronism with the driving force) to ninety degrees phase lag at resonant frequency and one hundred and eighty degrees phase lag at frequencies much larger than the resonant frequency.

In view of the foregoing, it will be apparent that the mass 10 should be kept substantially motionless. This can be realized by means of a resilient coupling of such compliance $$C_m = \frac{1}{K}$$

that the natural frequency of the system $$f_o = \frac{1}{2\pi}\sqrt{\frac{K}{M}}$$

is much lower than the frequency of oscillation of the vibrator 6.

It will also be apparent to those skilled in the art of seismic surveying, that the transmitter 6, when coupled as shown in Figure 1, may be mounted on suitable skids or the like (not shown) whereby the vibrator 6 may be dragged across the surface of the earth 8. The vibrator 6 may be operated while being dragged without materially affecting the coupling of the vibrator to the earth. Therefore, a vibratory signal may be generated over a large area of the earth 8 without the necessity of mounting or uncoupling the transmitter 6.

Figure 3:
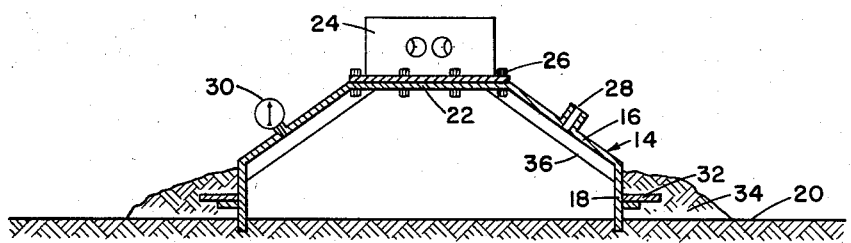
Figure 2:
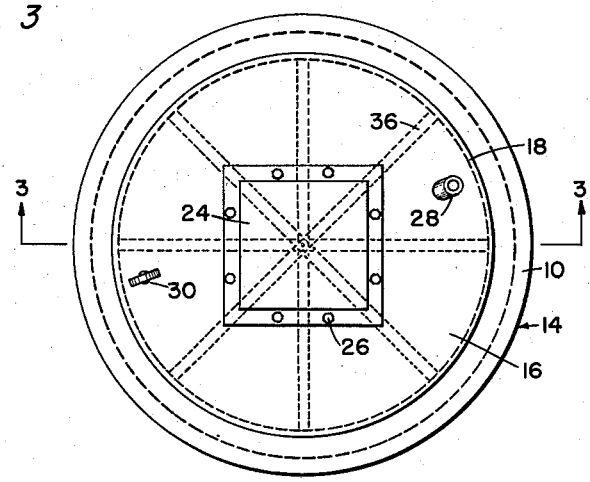
Figure 2 is a plan view of another form of apparatus which may be used, wherein the vibrator is shown schematically.

The apparatus shown in Figures 2 and 3 illustrates the use of a vacuum type coupler apparatus generally indicated at 14, and comprising a cup-shaped member or dome 16. A ring 18 is formed on the lower end of the dome 16 for contact with and possible insertion in the earth 20. The ring 18 will be inserted in the earth 20 to an extent depending upon the type of soil encountered, as will be hereinafter set forth. The upper end 22 of the dome 16 is flattened to receive and support the vibrator 24. Suitable bolts or the like 26 are used in firmly securing the vibrator 24 on the dome 16. A nozzle 28 is provided in one side of the dome 16 for connection with a vacuum source, as will be more fully hereinafter set forth. Also, the dome 16 is preferably provided with a pressure gauge 30.

The coupler 14 operates or functions by maintaining a vacuum within the dome 16. To initially provide the vacuum, we prefer to use a common water truck (not shown) of the type normally available to seismic surveying crews, which is equipped with a large water tank and a vacuum pump interconnecting the water tank to the intake manifold of the truck engine. The truck is positioned adjacent the coupler 14 and the water tank is connected through a valve (not shown) to the nozzle 28. When this valve is closed and the truck engine is placed in operation, the air will be substantially evacuated from the water tank. Upon opening the valve, the vacuum in the water tank will impose a sudden vacuum through the nozzle 28 into the dome 16. The water tank being used is preferably larger than the dome 16 to provide a substantial, sudden vacuum in the dome. When this occurs, the atmospheric pressure will act on the outer surface of the dome 16 to force the rim 18 downwardly into the soil or earth 20 and firmly seat the coupler 14. The truck engine is continued in operation to maintain a vacuum in the dome 16.

It will be apparent that the amount of vacuum which may be maintained in the dome 16 depends to a large extent upon the leakage of air around the lower end of the rim 18. This leakage may be minimized by the use of a flange 32 secured circumferentially around the rim 18 a short distance above the earth 20. In some soils, the sudden evacuation of the dome 16 will force the rim 18 downwardly until the flange 32 contacts the earth 20, whereby the flange 32 will assist in preventing leakage into the dome 16. In other soils, however, it may be necessary to pack or tamp additional soil 34 around the rim 18 and over the flange 32 to prevent an excess leakage of air into the dome 16.

In operation of the vibrator 24, upward and downward forces are created to oscillate the vibrator 24 and dome 16 and vibrate the earth 20. It will be apparent that the dimensions of the dome 16 should be in proportion to the magnitude of the oscillating forces created by the vibrator 24, whereby the atmospheric pressure will retain the rim 18 in the earth. Also, the dome 16 should be sufficiently rigid that its natural vibrating frequency is much higher than the frequency of the vibrations being transmitted from the vibrator 24 to the earth 20. Otherwise, the dome 16 would act as a vibrating membrane radiating energy into the air. A plurality of radially extending braces 36 may be welded or otherwise rigidly secured to the under surface of the dome 16 for re-enforcement to increase the natural vibrating frequency of the dome if desired.

When using the coupler 14, the weight of the atmosphere pressing down on the dome 16 serves as the mass to retain the rim 18 in constant contact with the earth 20. It will be apparent that only the air in the immediate vicinity of the dome 16 will be moved during oscillation of the vibrator 24 and dome 16. Therefore, the major portion of the energy generated by the vibrator 24 will be transmitted to the earth 20. The air surrounding the dome 16 provides an elastic coupling between the mass of the atmosphere directly above the dome 16 and the vibrator 24 and provides a resonant frequency in the system lower than the frequency of oscillation of the vibrator 24. Thus, the air surrounding the dome 16 may be considered as the equivalent of the springs 12 in the apparatus shown in Figure 1.

The coupling apparatus shown in Figure 4 comprises a relatively stiff beam or bar 40, such as an I-beam, having wedge-shaped cross-members 42 and 44 on the opposite ends thereof. A vibrator 46 is rigidly secured on the central portion of the beam 40 in any suitable manner (not shown). The wedge-shaped cross-members 42 and 44 are properly spaced to receive the rear wheels 48 of a truck partially shown at 50. In this arrangement, the truck 50 acts as the mass for retaining the beam 40 in contact with the earth, and the rubber tires 49 of the wheels 48, along with the springs 52, provide the elastic coupling between the truck 50 and the beam 40.

In operation of the apparatus shown in Figure 4, the transmitter 46 operates in the usual manner to transmit energy through the beam 40 and cross-members 42 and 44 into the earth. It will be observed that the transmitter 46 is rigidly connected to the beam 40, therefore, the beam 40 and cross-members 42 and 44 will oscillate with the transmitter 46. The rubber tires 49 and rear springs 52 will give or flex to permit oscillation of the beam 40 and cross-members 42 and 44 while retaining the truck 50 substantially motionless. The natural frequency of the system may be controlled by varying the air pressure in tires 49 in order to retain the truck 50 substantially motionless.

This system is particulary useful when it is desired to transmit energy into the earth at a plurality of spaced points. The vibrator 46, beam 40, and cross-members 42 and 44 may be easily transported by the truck 50 to the desired location. Beam 40 may then be lowered to the ground, with the vibrator 46 in operating position, and the truck 50 backed in such a manner that the wheels 48 roll up on top of the cross-members 42 and 44. Whereupon, the vibrator 46 may be placed in operation to transmit energy into the earth and generate seismic waves.

Figure 5 illustrates another structure for coupling a vibrator 54 directly to the earth 56. In this example, a large mass 58 is supported on top of the vibrator 54 by a plurality of compression springs 60. The mass 58 has outwardly extending brackets 62 for receiving the upper ends of tension springs 64. The lower ends of the springs 64 are suitably secured in the earth 56, as by being secured to the upper ends of stakes 66 driven into the earth 56. This arrangement operates in substantially the same manner as the apparatus shown in Figure 1. However, the tension springs 64 exert a constant downward force on the mass 58 to increase the effective downward force created by the mass 58. The combined weight of the mass 58 and tension of the springs 64 is transmitted through the compression springs 60 to the transmitter 54. It will thus be apparent that the mass 58 need not be as large as the mass 10 in the apparatus of Figure 1 to retain similar vibrators in contact with the earth. Therefore, this arrangement of apparatus will be particularly useful in areas where a limited mass can be transported.

The vibrator 54 will operate in the usual manner to create upward and downward forces which provide vibrations of the earth 56 and oscillation of the vibrator 54. The mass 58, in co-operation with the tension springs 64, exerts a sufficient downward force to prevent jumping of the vibrator 54. Also, the compression springs 60 have the proper compliance characteristics to retain the mass 58 substantially motionless during operation of the vibrator 54. Therefore, the major portion of the energy generated by the vibrator 54 will be transmitted downwardly into the earth 56.

From the foregoing, it is apparent that the present invention will materially facilitate seismic surveying. By the use of this invention, a mechanical vibrator may be coupled to the earth by a sufficient force to retain the vibrator in constant contact with the earth, yet the major portion of the energy generated by the vibrator will be utilized in creating seismic waves in the earth. Also, the vibrator may be dragged over the surface of the earth without materially affecting the coupling of the vibrator to the earth, or the vibrator may be moved easily and conveniently to various locations and coupled to the earth in a minimum time.

Other modes of applying the principle of the invention may be employed, change being made as regards the details described, provided the features stated in any of the following claims or the equivalent of such be employed.

We, therefore, particularly point out and distinctly claim as our invention:

1. Apparatus for securing an oscillating vibrator to the surface of the earth, comprising an oscillating vibrator, weighting means having a weight greater than any vertically upward components of the forces generated by the vibrator minus the weight of the vibrator, and elastic means transmitting the weight of said first means to the vibrator, said elastic means having a compliance such that said first-mentioned means is retained substantially motionless during oscillation of the vibrator.

2. Apparatus as defined in claim 1 characterized further in that said elastic means has a compliance such that the natural frequency of the system comprising said first-mentioned means and said elastic means is substantially lower than the frequency of oscillation of the vibrator.

3. Apparatus as defined in claim 1 characterized further in that said elastic means has a compliance such that the natural frequency of the system comprising said first-mentioned means and said elastic means is substantially higher than the frequency of oscillation of the vibrator.

4. Apparatus as defined in claim 1 characterized further in that said first-mentioned means is a portion of the atmosphere.

5. Apparatus as defined in claim 1 characterized further in that said first-mentioned means is a mass of confined size.

6. Apparatus as defined in claim 1 characterized further in that said first-mentioned means is at least a portion of a motor vehicle.

References Cited in the file of this patent

UNITED STATES PATENTS

| | | |
|---|---|---|
| 2,353,492 | O'Connor | July 11, 1944 |
| 2,521,130 | Scherbatskoy | Sept. 5, 1950 |
| 2,620,766 | Seavey | Dec. 9, 1952 |

FOREIGN PATENTS

| | | |
|---|---|---|
| 541,651 | Germany | Jan. 12, 1932 |

OTHER REFERENCES

Howell et al.: "Propagation of Elastic Waves in the Earth," Geophysics, vol. V, No. 1, January 1940, pages 2 and 3 (entire article pages 1–14). (Copy in Div. 42.)

Bernhard: "Geophysical Study of Soil Dynamics," pages 3–6, Technical Publication No. 834, Am. Inst. of Mining & Metallurgical Engineers, 1938. (Copy in Scientific Library.)